United States Patent [19]
Vidal

[11] Patent Number: 5,611,555
[45] Date of Patent: Mar. 18, 1997

[54] ARTICULATED BALANCER WITH AN OSCILLATING AXLE AND HAVING LOCKING POSSIBILITIES

[76] Inventor: Carlos C. Vidal, Martinez de la Rosa 12, 18002 Granada, Spain

[21] Appl. No.: 177,082

[22] Filed: Jan. 3, 1994

[30] Foreign Application Priority Data

Jan. 4, 1993 [ES] Spain .................................... 9300004

[51] Int. Cl.⁶ .................................................. B60G 5/00
[52] U.S. Cl. .................. 280/113; 280/112.2; 280/62; 280/97; 180/215
[58] Field of Search ........................ 280/112.2, 113, 280/62, 282, 111, 126, 97, 772; 180/210, 211, 215

[56] References Cited

U.S. PATENT DOCUMENTS

| | | | |
|---|---|---|---|
| 2,819,093 | 1/1958 | Geiser | 180/215 |
| 3,572,456 | 3/1971 | Healy | 280/112.2 |
| 3,866,341 | 2/1975 | Fabrygel | 280/113 |
| 4,003,443 | 1/1977 | Boughers | 280/112.2 X |
| 4,088,199 | 5/1978 | Trautwein | 280/112.2 |
| 4,375,295 | 3/1983 | Solbes | 280/112.2 X |
| 4,887,829 | 12/1989 | Prince | 280/282 |
| 4,974,863 | 12/1990 | Patin | 280/62 |
| 5,040,812 | 8/1991 | Patin | 80/62 |

FOREIGN PATENT DOCUMENTS

1085100  1/1955  France ............................ 280/112.2

*Primary Examiner*—Christopher P. Ellis
*Attorney, Agent, or Firm*—Pollock, Vande Sande & Priddy

[57] ABSTRACT

An articulated balancer with an oscillating axle and having locking possibilities provides dynamic stability and static balance to a vehicle having a high center of gravity in rounding curves. This vehicle has three wheels, one in front and two in the rear. It rivals the maneuverability of a motorcycle, yet offers a higher level of safety and convenience than conventional motorcycles. The stability in curves is obtained by enhancing the lateral tilting of the vehicle. For this, each rear wheel must allow an up or down motion; each of these motions is opposite to the other but to the same extent. By means of "ball-and-socket" hinged joints, two connecting rods connect the balancer with the rear swinging forks, converting the balancer's rotation to an up-and-down motion. The balancer's axle allows an oscillation motion controlled by a shock absorber, that provides the rear suspension of the vehicle. The static balance and certain characteristics of its dynamic behavior are obtained by locking the rotation of the balancer.

5 Claims, 14 Drawing Sheets

ARTICULATED BALANCER WITH AN OSCILLATING AXLE AND HAVING LOCKING POSSIBILITIES

FIELD OF THE INVENTION

The instant invention ARTICULATED BALANCER relates to motorcycles and specifically is a mechanism that provides dynamic stability as well as static balance to light-weight, narrow, wheeled vehicles having a high center of gravity travelling around curves. The instant invention particularly focuses on a vehicle having three wheels, one in front and two in rear, that could be related to a conventional motorcycle.

The purpose of the instant invention vehicle is to combine the maneuverability of a motorcycle with higher levels of safety and convenience. Just like in the case of any motorcycle, the stability when taking a curve is obtained by a lateral shifting of its center of gravity, caused by the lateral tilting of the vehicle when approaching a curve.

BACKGROUND OF THE INVENTION

In the prior art, the characteristic feature of any vehicle having two wheels on the same wheel and axle assembly is that they are linked by one axle. Whether or not the axle is rigid, real or imaginary, the distance between both wheels, is maintained subsequently constant, and the oscillation of the wheels has the sole purpose of absorbing the irregularities of the terrain.

SUMMARY OF THE INVENTION

In a vehicle equipped with the inventive mechanism described herein, it is not possible to observe the existence of an axle between its rear wheels because, among other reasons, the distance between the centers of both wheels varies greatly with the inclination given to the vehicle. On the other hand, the oscillation allowed for the rear wheels, in addition to absorbing the irregularities of the terrain, also facilitates the lateral tilting of the vehicle, whether it is to one side or to the other according to the driver's requirement.

Therefore, it is not a question of modifying or improving any of the techniques used in the manufacture of the vehicle but rather that of applying a technique that, at least to the best knowledge of the inventor, is innovative.

Figure 1:
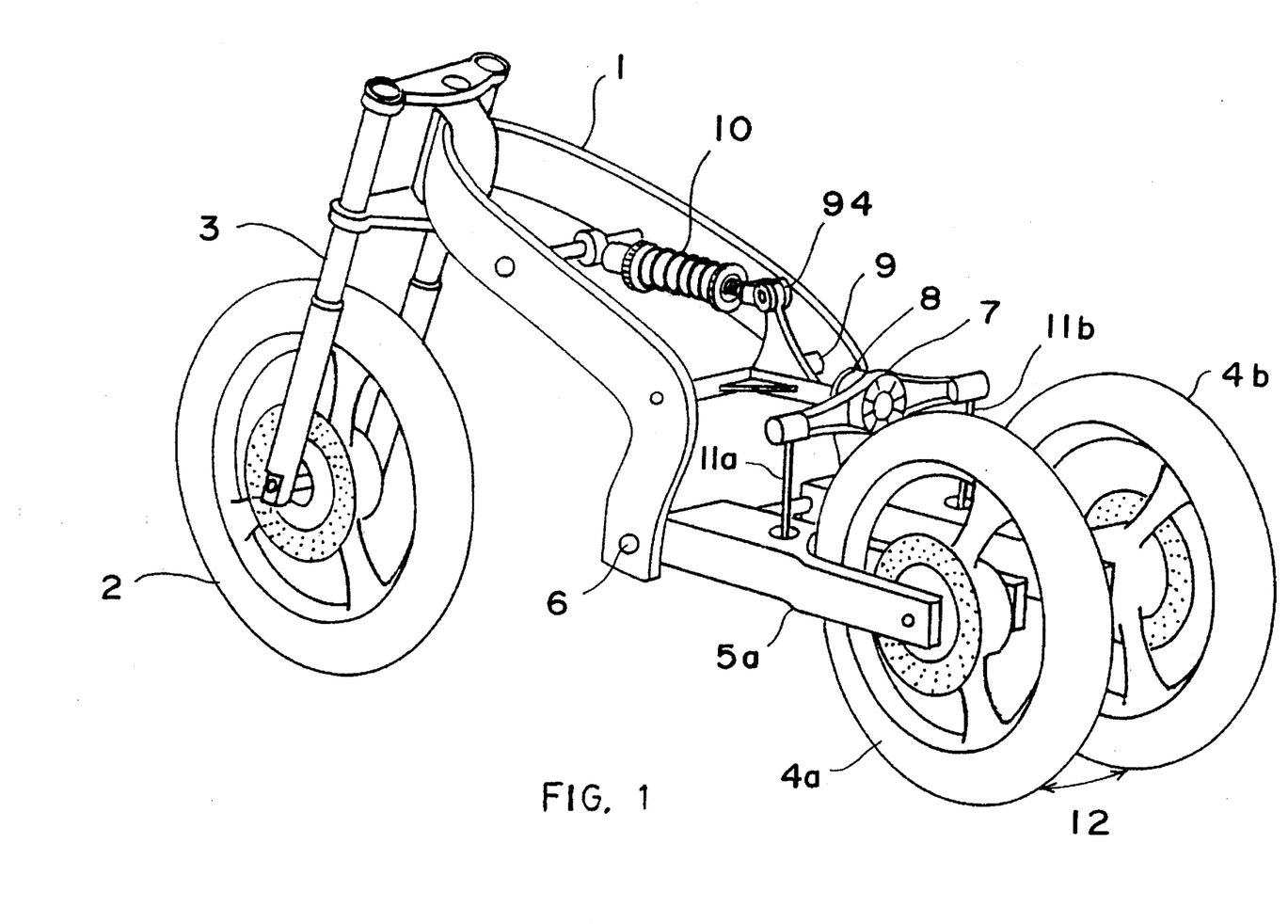
FIG. 1 is a perspective view of an exemplar vehicle constructed in accordance with the present invention.
Figure 2:
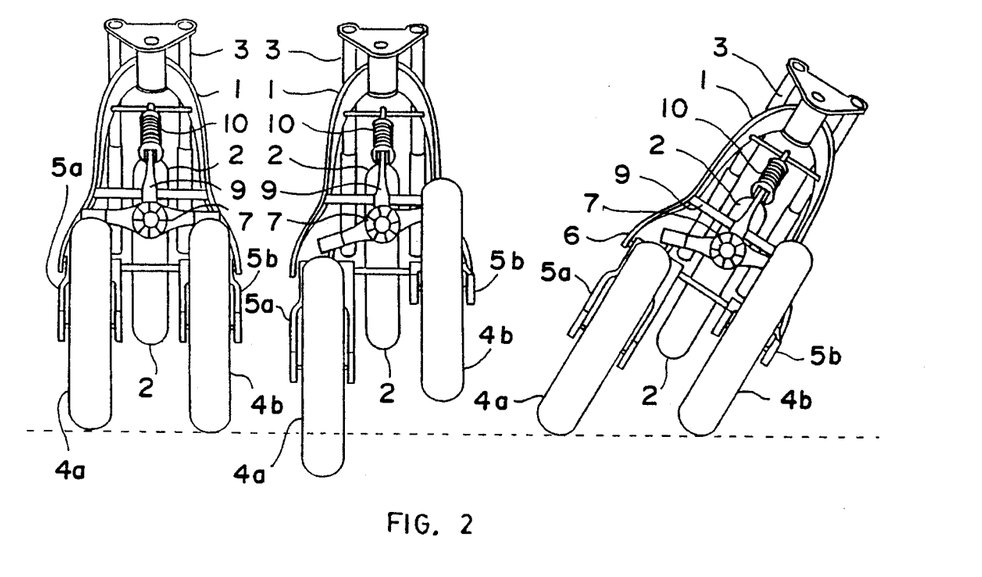
FIGS. 2, 3 and 4 each provide a rear view of the vehicle of FIG. 1 showing the oscillating movement of the rear wheels that allows the vehicle to tilt.
Figure 3:
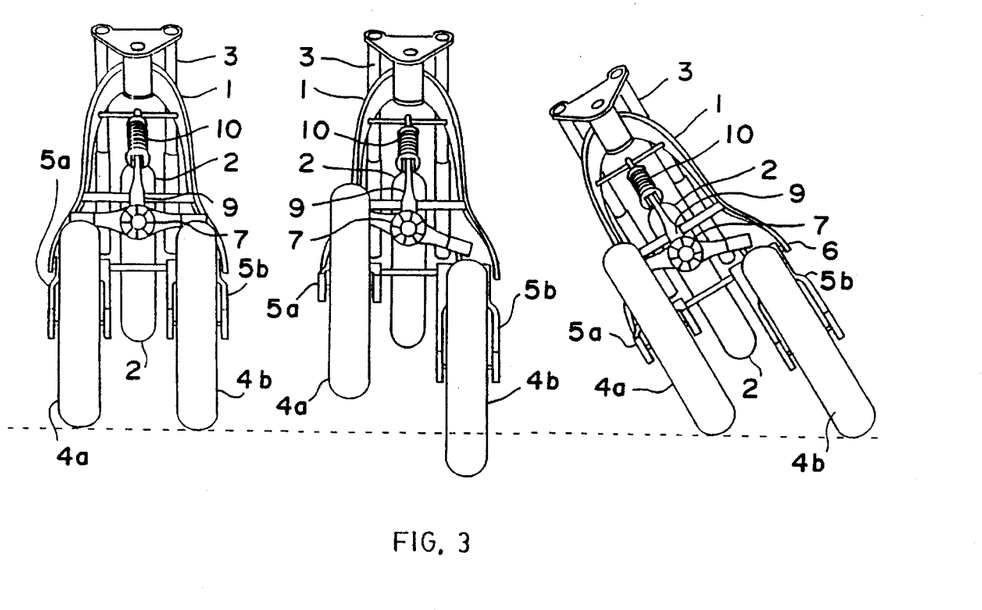

To obtain the lateral tilting of the vehicle described herein (FIG. 1), it is necessary to provide each rear wheel with an upward/downward oscillating movement, so that when one of the wheels rises the other one descends to the same extent, thus causing the tilting of the vehicle (FIGS. 2 and 3).

Thus, the inventive method obtains an appropriate performance of the vehicle's rear train, so that, although consisting of two wheels, it facilitates the lateral tilting of the vehicle, whether to one side or the other according to the driver's requirement.

To this effect, each of the rear wheels is connected to the frame of the vehicle by means of a swivel-mounted fork (hereinafter referred to as "swinging fork") similar to the one used in the conventional motorcycles. Both swinging forks are held at their front end (according to the direction of travel of the vehicle) by one only axle, not linked to them, that is anchored to the frame at its lower rear portion in a transverse direction of travel. Each of the rear wheels has its own axle that is located at the rear end of each swinging fork.

The only front wheel of the vehicle is connected to the frame by means of a hydraulic, telescopic fork, identical to the one used for conventional motorcycles, having also the same fastening and directional geometry.

The described oscillating movement of the rear wheels is obtained by means of a lever, referred to as a "balancer," that at its midpoint is held fast by an axle, around which it rotates. The balancer is installed perpendicularly to the swinging forks and, depending on the characteristics of performance required by the vehicle, it can be located on a plane that is either higher or lower than the plane of the swinging forks.

Figure 4:
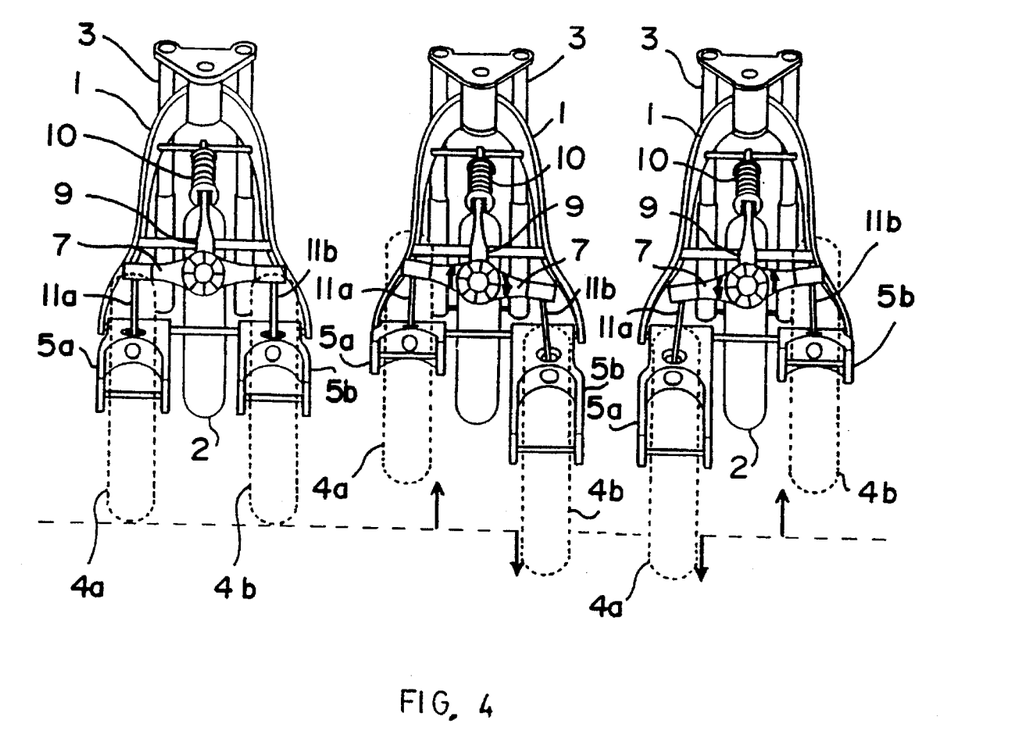

At each end of the balancer is hinged a connecting rod that links to the swinging fork at its end, so that when one swinging fork ascends it causes a rotary motion of the balancer which, in turn, causes the swinging fork of the other end to descend, and vice versa (FIG. 4).

Thus, it can be gathered that by means of the connecting rods the rotary motion of the balancer becomes an up-and-down motion of the swinging forks. Several factors must be taken into consideration for this transformation of movement. Thus, by way of example, the initial parallelism of the connecting rods is lost with the rotating of the balancer, due to the latter being of fixed length; moreover, the angles formed by the connecting rod with the balancer or the swinging forks are continuously modified by the action of the mechanism.

Thus, to obtain a smooth and resistance-free transformation of movements, it thus becomes necessary to provide the invention with an adequate system of hinged joints between its various elements to eliminate the stresses that may affect its performance due to the constant modification of values and their ratios.

The suitable hinged joint is the so-called "ball-and-socket" joint which, within some of the values, allows the connecting rods to form any angle with respect to the balancer and the swinging forks. Therefore, each end of the connecting rods is provided with a ball joint having a diameter greater than that of the rod that links them. Inversely, each end of the balancer and each of the swinging forks is provided with a corresponding socket or opening that enables the housing, without too much play, of the connecting rods' ball joints.

As a matter of course, the axle that holds the balancer at its midpoint is parallel to the swinging forks and equidistant to them when the vehicle is in a vertical position or position of rest. It can be located at a higher or lower plane than that of the swinging forks, as mentioned earlier when describing the location of the balancer.

Figure 5:
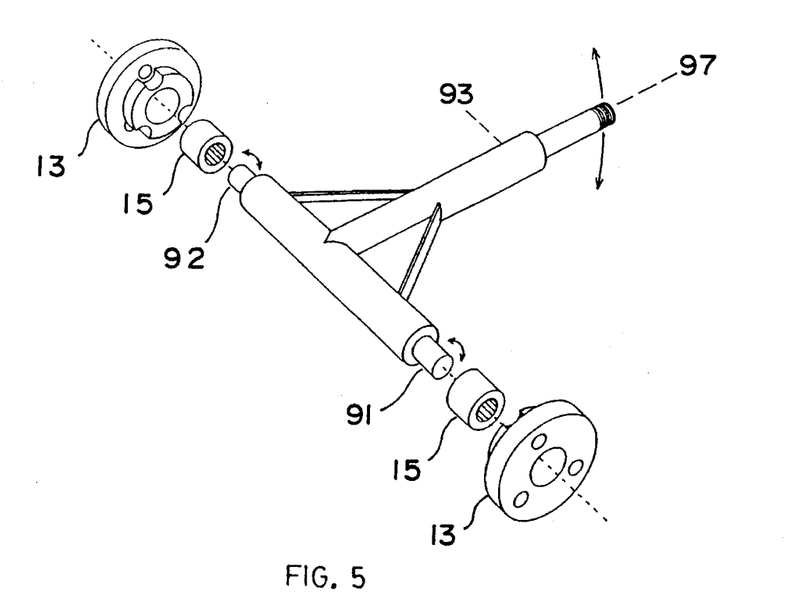
FIG. 5 is a perspective view of the balancer and axle of the instant invention.
Figure 6:
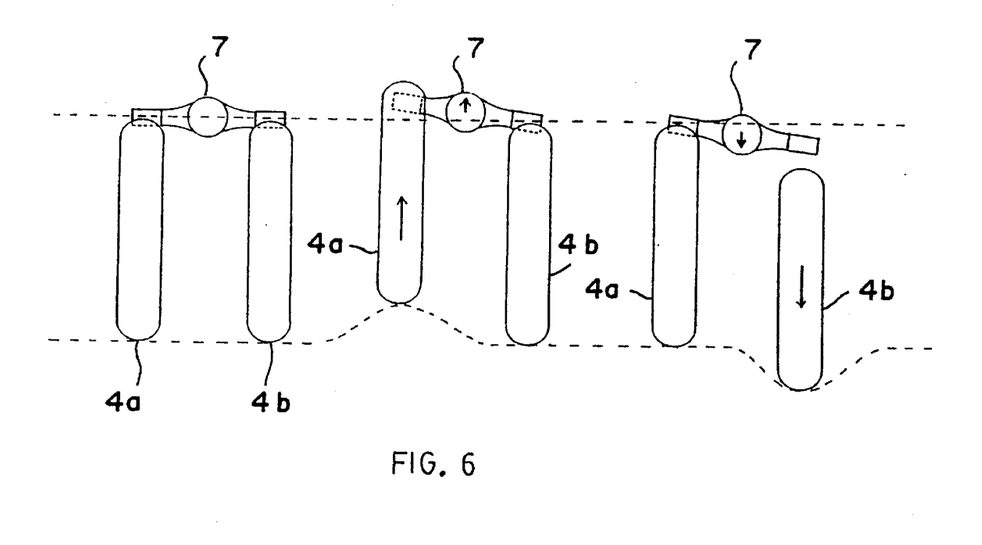
FIG. 6 is a diagram illustrating how the suspension of the instant invention works independent of the inclination mechanism.

In order to be able to provide suspension to the vehicle's rear train, the connection of this axle to the vehicle's frame cannot be fixed or rigid, but in such a manner that it allows an oscillating upward/downward movement controlled by one only shock absorber, similar to the one used for modern motorcycles (FIGS. 5 and 6).

The axle is connected to the vehicle's frame by means of a bracket to obtain its oscillating motion. Both axle and bracket constitute one piece which, in principle is T-shape. Being fastened to the vehicle's frame at is front ends (depending on the direction of travel), the rear end, the axle in the strictest sense, the axle and bracket piece allows an up-and-down oscillating motion. As a matter of course, the fastening of the ends of the brackets to the vehicle's frame must incorporate the pertinent antifriction bearings, that would allow the described motion without any resistance.

The axle and bracket piece can be of several shapes, in addition to the one already described. This will depend on a number of factors, among which include the fastening of the shock absorber, according to the characteristics of the vehicle's performance. In a similar manner, the shape of the balancer, of the sockets or of the connecting rods, can differ from the shapes suggested in the illustrations that accompany this description without modifying the operating principle of the invention nor be detrimental to the uniqueness of the invention.

The possibility of locking the rotation of the balancer offers important applications, providing the vehicle with static balance or setting safety margins in dangerous situations. This possibility of locking is incorporated by using a locking system.

The drum locking system is appropriate for this invention because of its simplicity, low cost and suitable adaption. It operates and actuates in a manner similar to that of the conventional drum brake.

Figure 27:
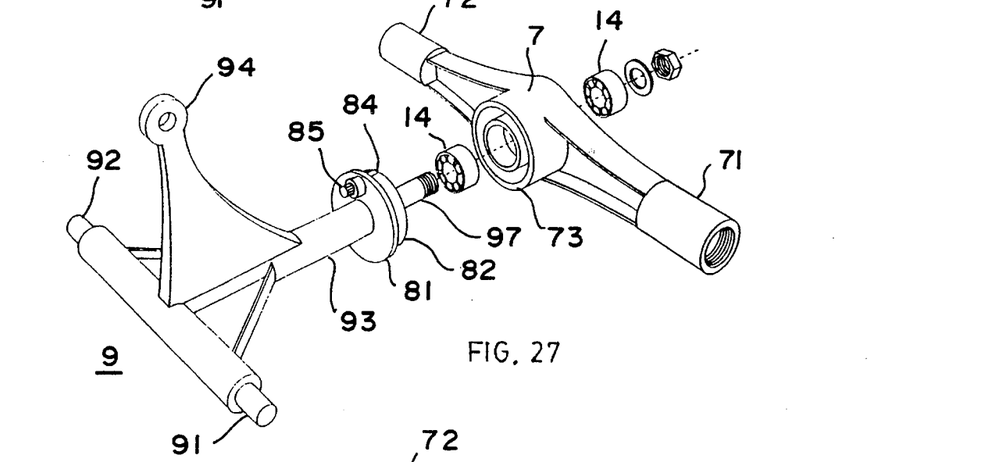

In this drum locking system, the brake disc that incorporates the brake shoes, its motion bar guides, the shock-absorbent back springs, the drive cams and its axle, are installed in the front portion of the balancer's axle, as shown in FIG. 27. When the brake cam is actuated (FIGS. 24 and 25), the shoes expand an rub against the drum, thus preventing it from rotation. Obviously, the drum must be an integral part of the balancer, either as one element with it (FIG. 8), or being integrally linked to it.

The only difference of note with respect to the conventional drum brake is the practically non-existing friction between the shoes and the drum which allows the material of the shoes to be changed. In addition, the drum is provided with a certain roughness or internal grooving to achieve effective locking with the smallest possible diameter of the drum.

According to the heretofore description, the balancer and its axle are deemed not jointly linked. It is feasible, however, that both be jointly linked. This entails that the piece made-up of the axle and its bracket be modified and locking elements be at a different location.

Figure 9:
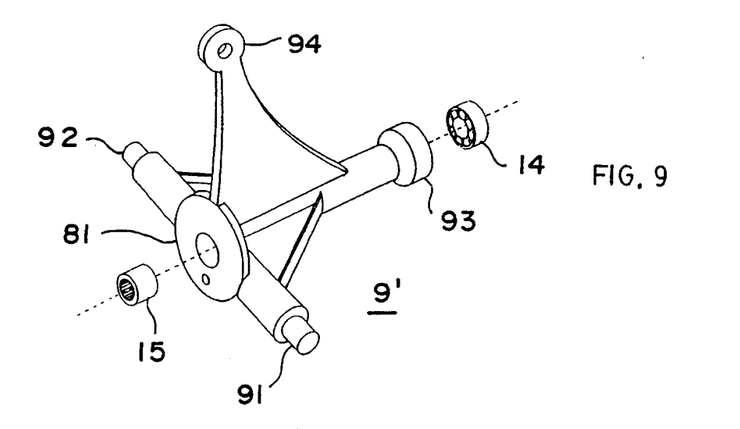
FIGS. 9 and 10 illustrate two options of the FIG. 5 assembly, when the balancer axle is included.
Figure 10:
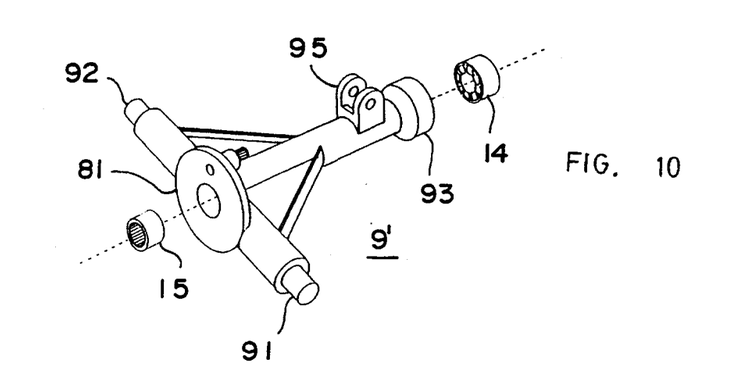
Figure 28:
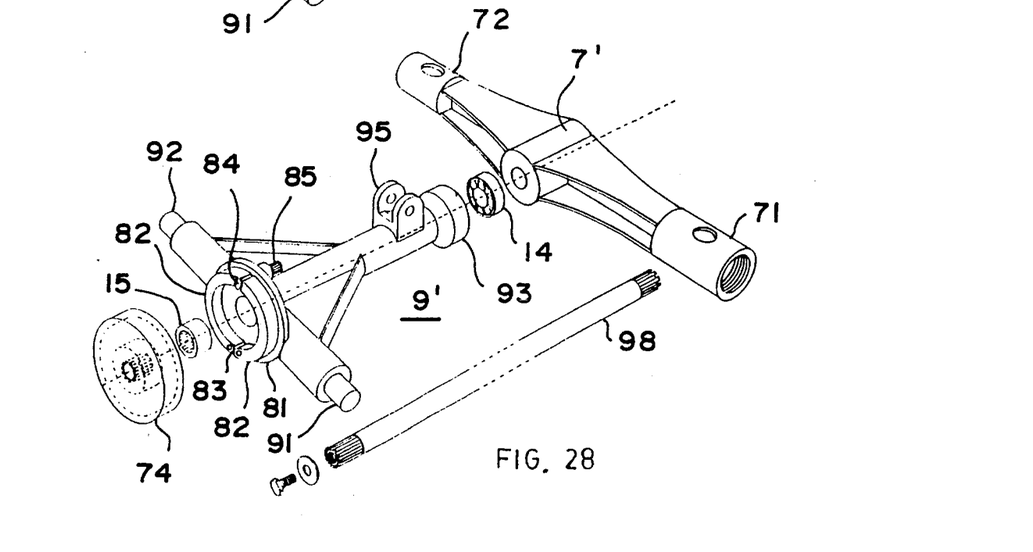
Figures 29, 30, 31:
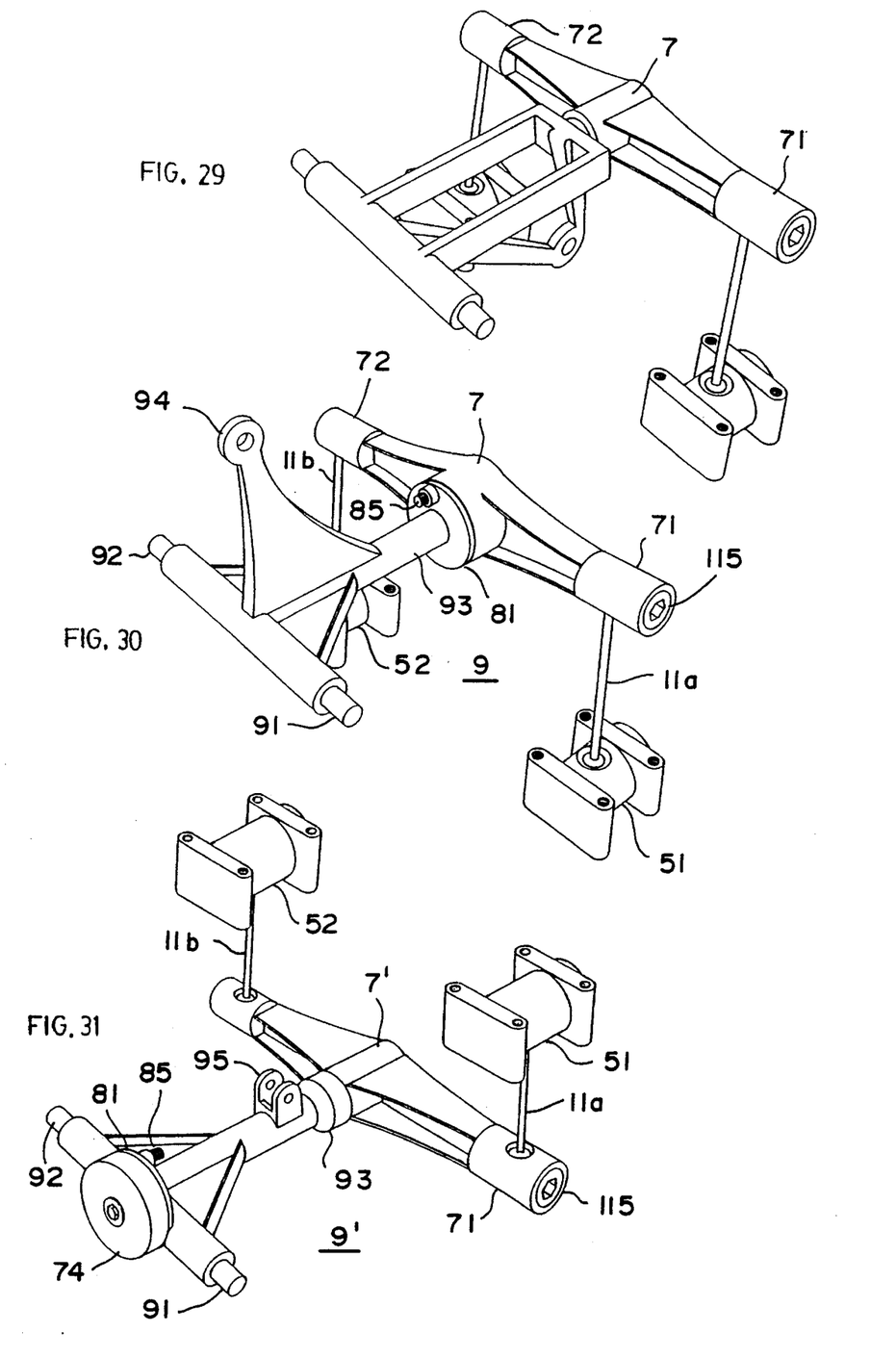

Presumably, the piece constituted by the axle and the bracket is of T-shape, but the element that acts as an axle can become the axle's "guide" (FIGS. 9 and 10). The balancer's axle can be inserted into this guide, with its front protruding (depending on the vehicle's direction of travel) to connect with the drum and its rear extremity protruding to connect with the balancer (FIG. 28). The brake disc, with all of its components, is located at the bracket and the front part of the axle's guide, as shown in FIG. 28.

Compared with a conventional motorcycle, the vehicle provided with the articulated balancer of the instant invention provides more convenience and greater safety than a conventional motorcycle without losing its maneuverability. Herein are some advantages:

1) The driver need not hold the vehicle with his legs when he momentarily stops because the vehicle will vertically maintain itself since the balancer is locked.

2) In view of the above reason, the vehicle allows enveloping cowlings that protects against cold weather and rain. Therefore, vehicles having attached thereto the instant invention can easily maneuver in chaotic city traffic without sacrificing safety and convenience.

3) No effort is needed to park the vehicle, even on sloped road surfaces since it not equipped with stands.

4) In case of breakdowns, the vehicle can be easily pushed without the risk that it would fall to one side. Moreover, due to the fact that it can stand on its own, the vehicle's cleaning and maintenance operations are easier to carry out.

5) The elimination of weight allows the vehicle to be provided with elements that contribute to its convenience and safety: automatic locking devices for the balancer; an integral braking with only one foot control; and anti-locking system for the ABS brakes; fuel tanks of greater capacity; wider and more comfortable seats; etc.

6) The user friendliness of this vehicle is appropriate for automatic transmissions as well as "reverse" in the most varied implementations.

7) The vehicle inspires the driver with trust. This will make this type of vehicle accessible to a wide sector of users who are reluctant to get on a motorcycle.

With respect to safety, the vehicle equipped with the balancer of the instant invention presents the following advantages with respect to any conventional motorcycle:

1) It considerably reduces the possibility of a rear train slipping (the most frequent one in the case of motorcycles), either because of excessive speed along curves or improper acceleration or braking when the vehicle is tilted.

2) It offers more traction in any situation on any type of terrain, in particular when they are slippery.

3) It brakes better, from better holding due to the third wheel, and in particular, a greater stability while braking.

4) The locking of the balance's rotation maintains the balance of the vehicle in case of slipping, additionally providing a safety margin in this and other dangerous situations.

The stated advantages 1, 2 and 3 are evident. Advantage 4 is further explained below.

Figure 34:
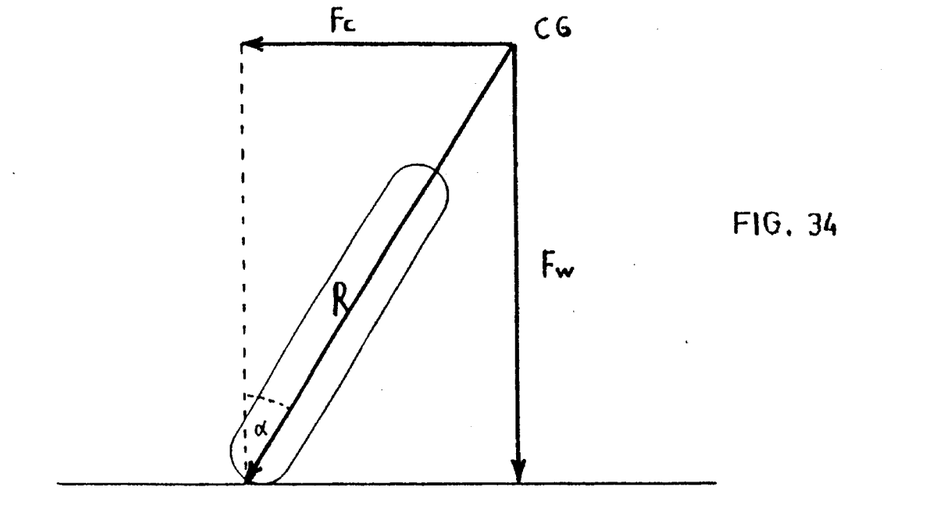
FIGS. 34 and 35 are diagrams illustrating the tilting of a vehicle in accordance with the instant invention.

With reference to FIG. 34, the balance of a conventional motorcycle is seen to require that the force R, the resultant of the other two forces that must be considered (Fc= centrifugal force; Fw=weight of the vehicle) passes through ideal line of points to the ground that connects the contact points wheels-to-ground. The driver achieves this by tilting, almost instinctively, at the exact angle that corresponds, depending on the speed of the motorcycle, to the radius of the curve he is taking. In this situation, any slight slippage of the front or rear assembly results in an immediate variation of the tilt angle, which causes the loss of balance and the subsequent mishap or accident.

In a vehicle equipped with the invention, if the driver realizes that the situation may become dangerous (excessive speed on wet ground, gravel, oily spots, etc.) he prepares to lock the balancer so that, in case slipping occurs, the vehicle's tilt angle is not changed, thus maintaining the balance and facilitating its control. In vehicles equipped with ABS, this system could automatically lock the balancer's rotation when it detects any locking of the wheels or notes any difference in the rotating of the front and rear wheels.

There exist other situations in which the locking of the balancer establishes a safety margin. Thus, an excessive speed when entering a curve, or a curve of variable radius taken at an improper speed, would compel the driver to tilt the motorcycle to a greater extent than he is psychologically prepared, or more than advisable due to the treadwear of the tires or the condition of the roadway. In such a situation, the driver, aware of the danger of slipping by applying the brake when tilting the motorcycle, tends to increase the radius of the curve resulting in a possible running off the roadway or swerving into the oncoming traffic lane.

Under these circumstances, the locking of the balancer establishes a safety margin that overcomes such risks without the need of an excessive tilting of the vehicle; furthermore, the tires would operate within their best range of adherence.

The following example will explain the foregoing. Assume that the vehicle+drive have a weight of W=250 kilograms; that the speed at which the vehicle travels is 90 km/hour (V=25 meters/second); that r=100 meters is the radius of the curve; that 0.85 meters is the height of the center of gravity with the vehicle in a vertical position; and that a=0.36 meters is the width of the rear track gage being the vehicle in a vertical position.

Figure 35:
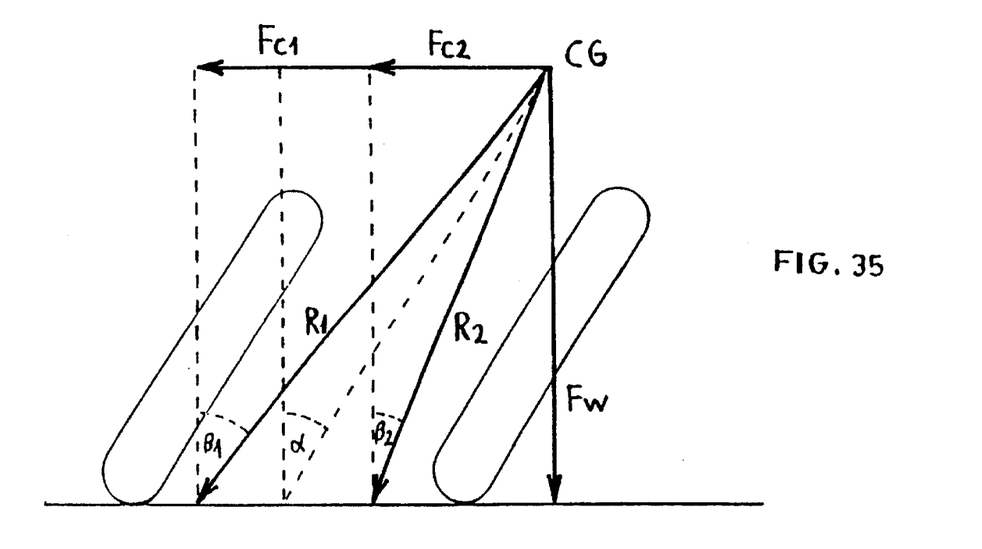

In a normal situation (free-running balancer), the tilt angle with respect to the verticality of the vehicle is the same as that for a motorcycle which, barring an error, is of 32°32'. However, as shown in FIG. 35, with the locked balancer, the tilt angle at which the force R is effective is not the only one but it also is susceptible to a range between $R_1$ and $R_2$, within which the vehicle maintains its balance.

The higher or lower range of these values depends on the width of the rear track gage (a), on the previous tilt angle of the vehicle ($\alpha$), on the height of the center of gravity of the vehicle (h), and on the point at which is its center of gravity with respect to the wheel base of the vehicle (d). In the above example, if we assume that the vehicle's center of gravity is located at the rear ⅔ of the vehicle's wheel base (measured from the center of the front wheel to the midpoint between the center of the rear wheels), we can calculate the maximum ($\beta_1$) and minimum ($\beta_2$) tilt values of $R_1$ and $R_2$ according to the below formula:

$$TgB = Tg\alpha \pm \frac{d \cdot a}{2 \cdot h \cdot \cos^2 \alpha}$$

In the above example, the maximum and minimum values of the tilt, barring an error would be 39°54' and 23°42', respectively.

This means that the vehicle with the balancer locked at a 32°32' tilt is capable of compensating a centrifugal force which for a motorcycle would require tilts between 23°42' and 39°54' that correspond to speeds between 74.68 km/h and 103.06 km/h for a 100-m radius of curve. In other words, for a speed of 90 km/h, without losing balance a variation of the radius of the curve between 145.2 meters and 76.2 meters is allowed.

It is obvious that the manual locking of the balancer's rotating requires, just like everything, a certain degree of training. However, such locking can be done automatically. The possibility of linking such locking to the ABS system was discussed earlier but it can be supplemented with a microprocessor that by analyzing parameters such as speed, tilt, centrifugal force, acceleration, deceleration, etc. will determine the exact moment for the automatic locking and unlocking of the rotating of the balancer.

BRIEF DESCRIPTION OF THE DRAWINGS

The above-mentioned objective and advantages of the present invention will become apparent and the invention itself will be best understood by reference to the following description of embodiments of the invention taken in conjunction with the accompanying drawings, where.

DESCRIPTION OF THE PREFERRED EMBODIMENTS

Figure 7:
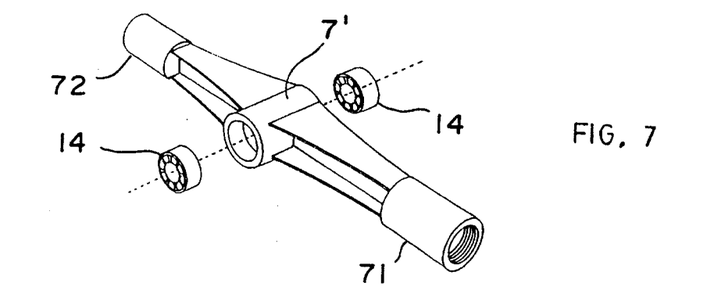
FIGS. 7 and 8 each show an exemplar balancer not joined to an axle.

BALANCER (7,7'). Of solid, light-weight construction to prevent torsion and inertias, it is desirable that it be manufactured in one piece which, depending on the construction, can be incorporated into the drum brake (FIG. 8) or not (FIG. 7). At the ends of the balancer are installed the ball joints, 71, 72 reference to which will be made later.

Figure 8:
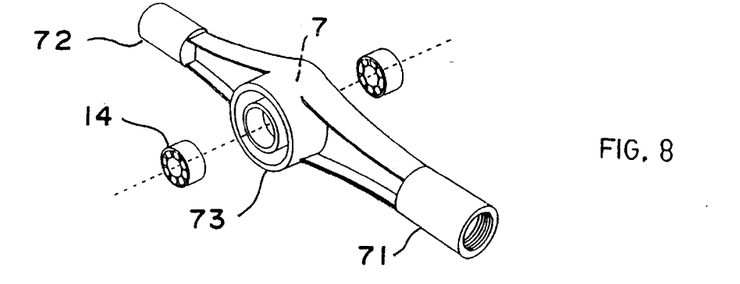

In case the balancer 7 and its axle 97 are not in one piece, there must be installed appropriate antifriction bearings that will allow the balancer to rotate without resistance around the axle. By way of indication, FIG. 8 shows bearings of angular contact with a double row of balls 14 at both ends of the balancer set in the recesses.

In case the balancer 7' and its axle 98 were one piece, the antifriction bearings would be housed in the piece the axle-bracket guide assembly 9'. As shown in FIGS. 9 and 10, roller bearings 15 may be used for the front end and ball bearings 14 for the rear end.

Figure 11:
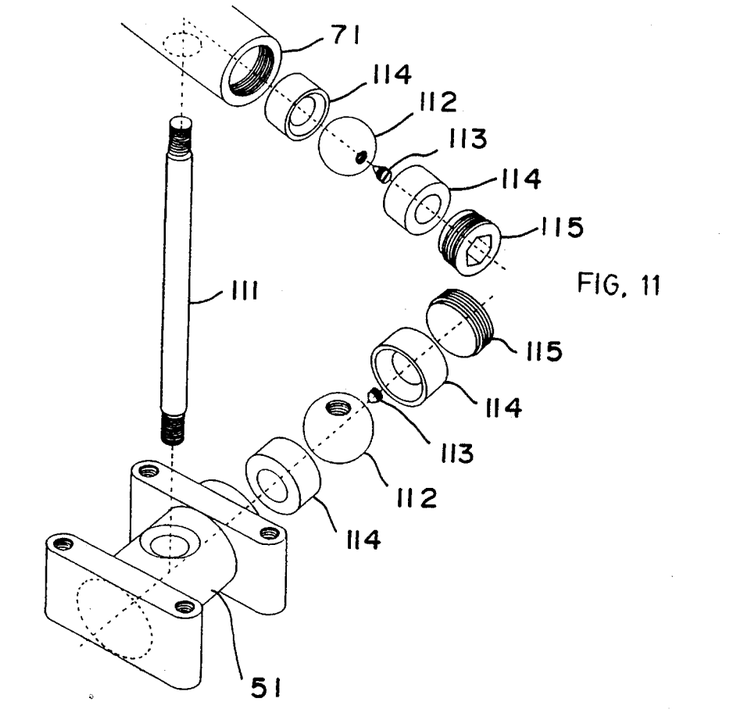
FIGS. 11, 12, 13 and 14 together illustrate the system of the ball and socket joints between the balancer and the swinging forks, and their connections by means of connecting rods.
Figure 12:
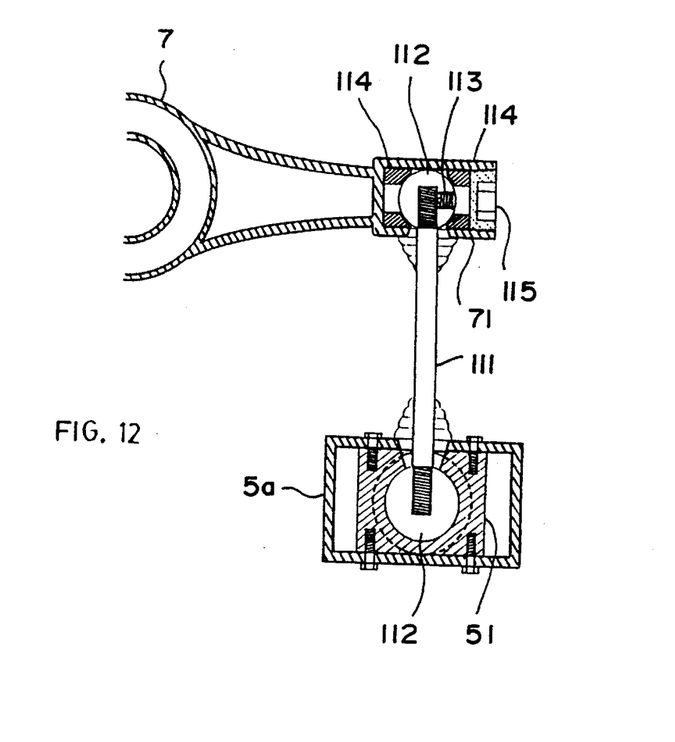

BALL JOINTS OF THE BALANCER (71, 72). Located at both ends of the balancer, they are an integral part of it. In case the chosen system of adapting the hinged joint by means of "ball-and-socket" requires it, they must be able to be disassembled so that balls 112 of the connecting rods 11a and 11b can be inserted into them. As an alternative, balls 112 of the connecting rods 11a and 11b could be removable laterally insertable into the ball joints of the balancer, the ball 112 being held between spherical half-bearings 114, as shown in FIGS. 11 and 12.

The hinged joint must be suitably lubricated in order to minimize friction between the ball 112 and the half-bearings 114. Also, dirt is prevented from entering the hinged joint by the installation of some type of rubber or plastic bellows that would not impair the play of the hinged joint.

CONNECTING RODS (11A, 11B). There are two connecting rods 11a and 11b and their function is to convert the rotary motion of the balancer (7, 7') to an up and down motion of the swinging forks (5a, 5b) or vice versa. At each of their end of the connecting rod (11a, 11b) there is provided a ball 112 with a diameter greater than that of the rod. One of the balls of each of the connecting rods 11a and 11b is housed in the ball joint of the balancer (71, 72) while the other one is housed in the ball joint of the swinging fork (51, 52) at the same side. The balls 112 can be either an integral part of the connecting rods or removable therefrom, depending on the assembly system used for the hinged joint.

FIGS. 11, 12, 13, and 14 show an exemplar system that requires the disassembly of the two balls 112 of each connecting rod. Both balls 112 are tapped or threaded to the rod that connects them, this connection being secured by means of a small setscrew 113. The opening in each ball into which the setscrew is inserted allows the immobilization of the ball once it is inserted into the ball joint.

BALL JOINTS OF THE SWINGING FORKS. At each swinging fork (5a, 5b) a ball joint (51, 52) is installed in an area near the point where the fork splits. The ball joint (51, 52) has the same function as that of the balancer and is provided with the above-mentioned lubrication and rubber or plastic protectors. The options for the construction differ depending on the type of swinging forks used and on the chosen assembly system.

Figure 13:
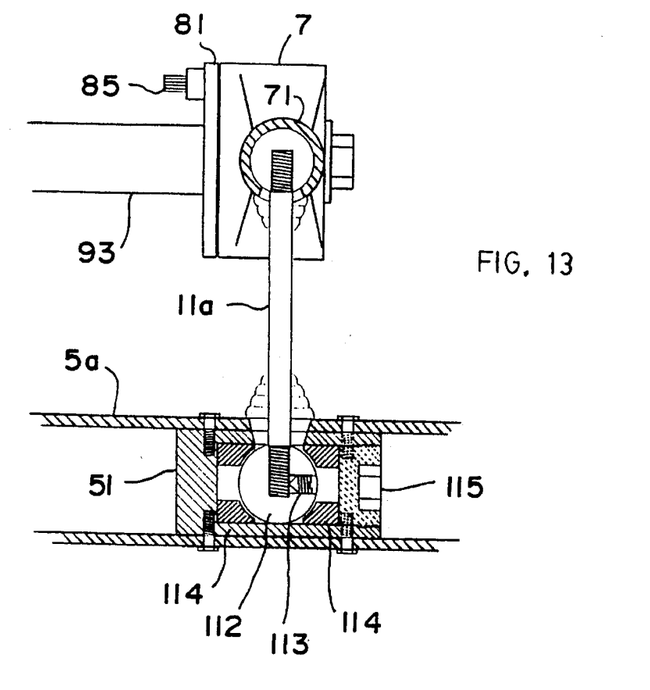
Figure 14:
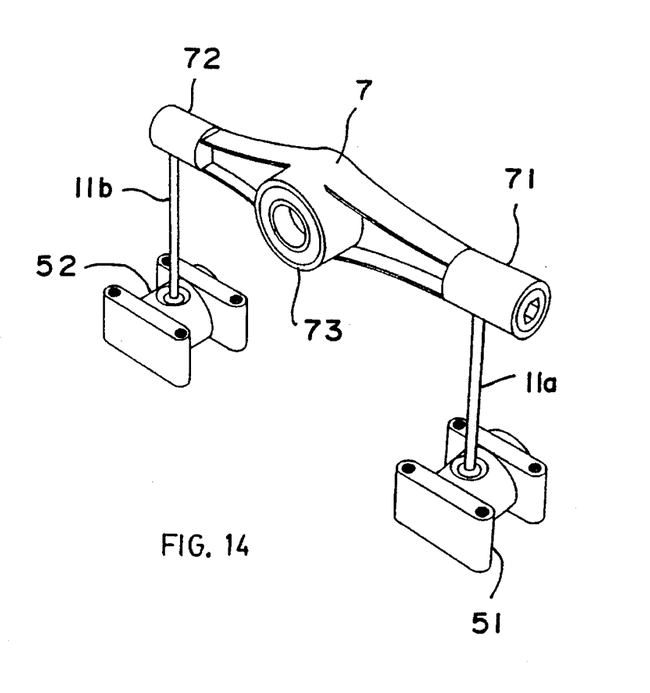

As shown in FIGS. 11 and 13, the suggested solution for the connecting rod-swinging fork joint is identical to the one described for the connection rod-balancer. The ball joint (51, 52) of the swinging fork, constructed independently of the latter, is inserted inside the swinging fork (5a, 5b), which is hollow in the area in front of where it splits and is secured to it by means of screws or welds. The opening of the ball joint through which are inserted the half-bearings 114 and the ball 112 is located in the area of the splitting, as shown in FIG. 4.

ASSEMBLY TO FIXED THE AXLE OF THE BALANCER (9, 9'). As mentioned earlier, for the balancer to move up and down it must be fastened to the vehicle's frame by means of an assembly that is provided with the appropriate antifriction bearings 15 that enable such a motion (FIG. 5). The assembly of pieces can incorporate a coupling device or an arm for the coupling of the shock absorber 10 and, if applicable, the brake disc for the locking of the balancer. The axle may or may not be an integral part of the balancer (7, 7').

Figure 15:
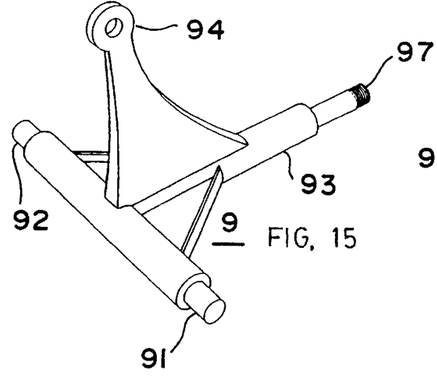
FIGS. 15, 16, 17, 18, 19 and 20 illustrate different embodiments of the assembly of the instant invention.
Figure 16:
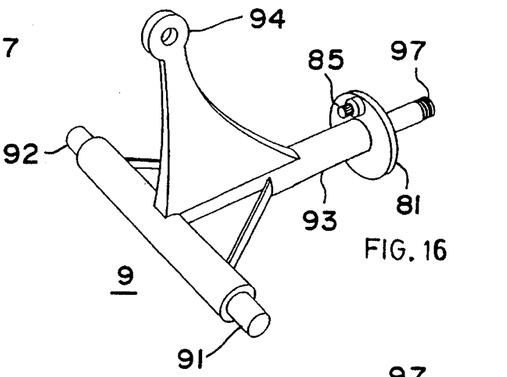
Figure 17:
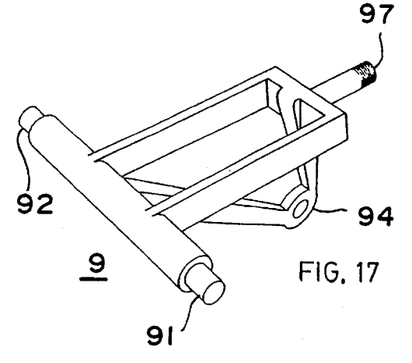
Figure 18:
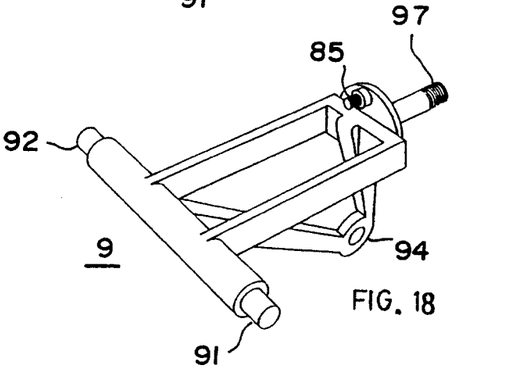
Figure 19:
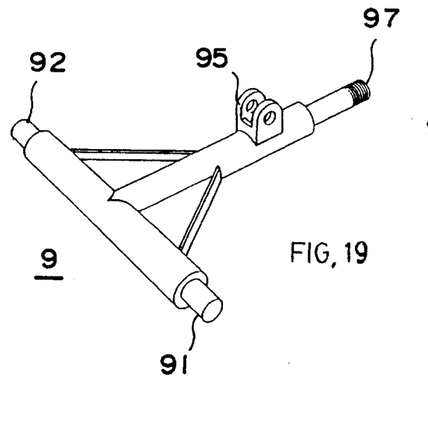

In case the axle is not an integral part of the balancer 7, the assembly 9 will incorporate the axle 97 and it may be of any of the types that, by way of indication, are shown in FIGS. 15, 17 and 19. If the mechanism is also provided with the device for locking the balancer's rotation, the assembly must also incorporate the brake disc, as shown in FIGS. 16, 18 and 20.

Figure 21:
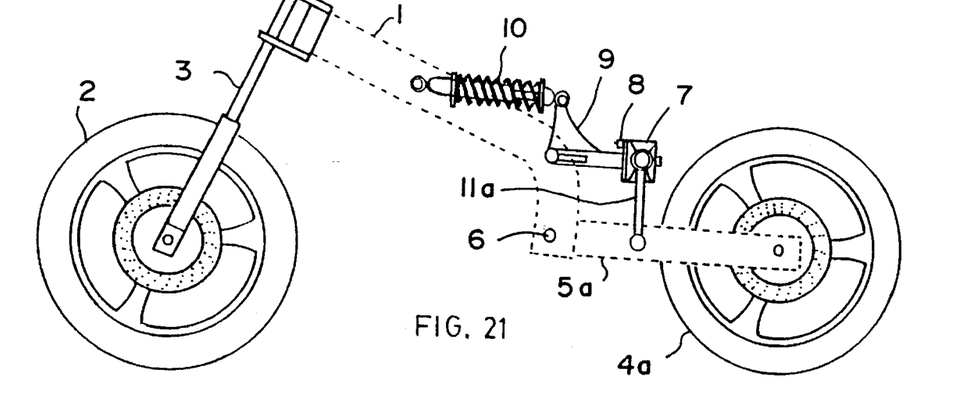
FIGS. 21, 22 and 23 are respective side views of a vehicle of the instant invention, showing different embodiments for positioning the mechanism of the instant invention with respect to its shock absorber.

As shown in FIGS. 15 and 16, the assembly 9 comprises an upper arm 94 for coupling the shock absorber 10. This type of assembly is deemed appropriate when the balancer 7 is installed at a plane higher than that of the swinging forks (5a, 5b) in order to avoid an excessive height for fastening the shock absorber to the vehicle's frame 1. Consequently, shock absorber 10 is installed at a practically horizontal position (FIG. 21).

Figure 22:
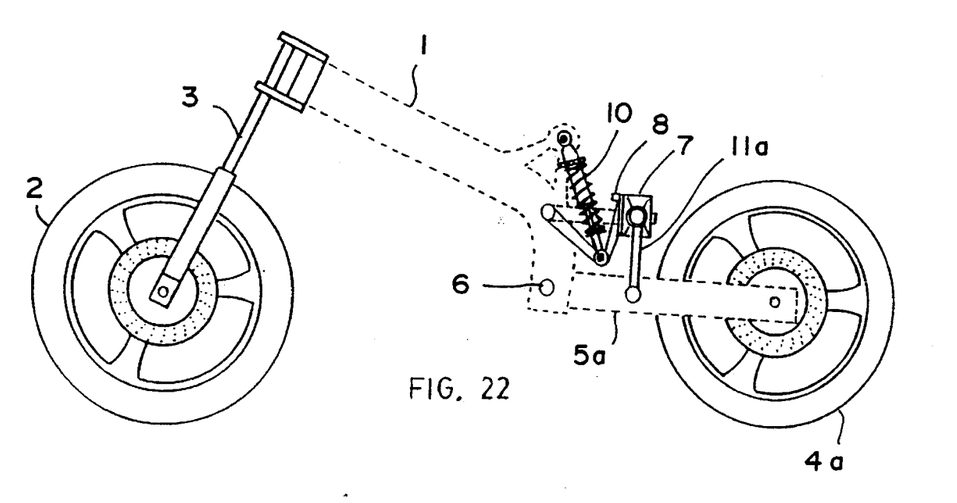

Similarly, the assembly 9 illustrated in FIGS. 17 and 18 comprises a lower arm 94 for coupling the shock absorber 10, thus reducing the height at which it is fastened to the vehicle's frame 1 (FIG. 22).

Figure 20:
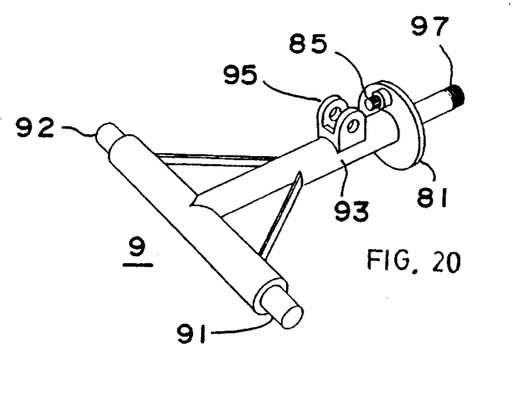
Figure 23:
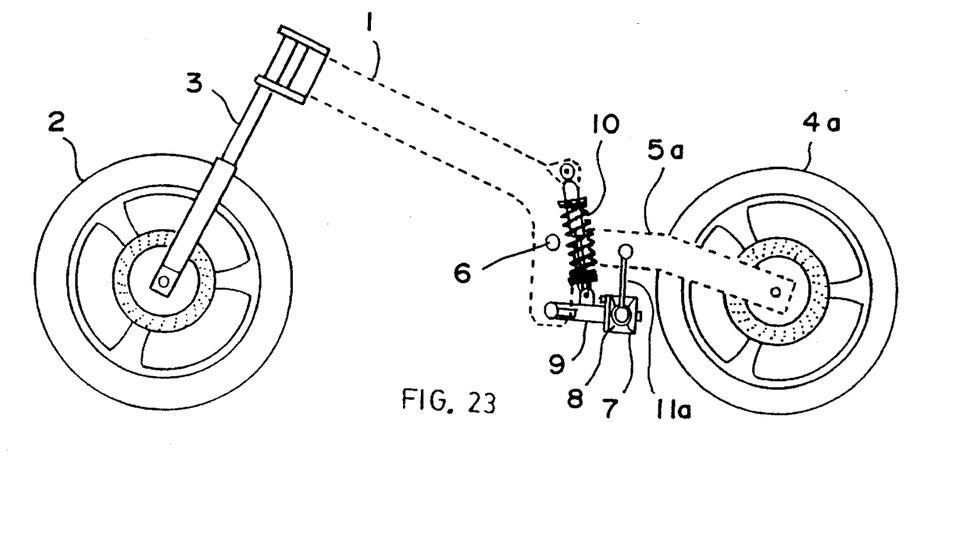

Lastly, the assembly shown in FIGS. 19 and 20 provides fastening of the shock absorber 10 in an almost vertical position when the balancer is located at a lower plane than that of the swinging forks (FIG. 23).

In case the axle is an integral part of the balancer 7', the assembly 9' does not comprise the independent axle 98, but rather a guide for it, where it is introduced longitudinally. This option makes sense if the mechanism comprises the locking device; therefore, the axle guide-bracket assembly 9', shown in FIGS. 9 and 10, incorporates the brake disc. The upper arm 94 of the coupling (FIG. 9) or the coupling device (FIG. 10) show us the method of fastening the shock absorber 10 to the vehicle's frame 1, as explained above.

In all of the above options discussed, it was assumed that the sole shock absorber 10 is directly fastened to the assembly (9, 9'). Nonetheless, the control of the oscillating motion of the balancer's axle (97, 98) can be carried out by means of a system of articulated connecting rods inserted between the assembly (9, 9') and the shock absorber 10.

Finally it must be mentioned that the coupling of the assembly (9, 9') to the frame 1 can be carried out by various means, one of which is shown in FIG. 5 where the entire assembly (9, 9') is fastened by means of two independent elements 13, located at each end (91, 92), that are screwed onto the vehicle's frame 1.

Figure 24:
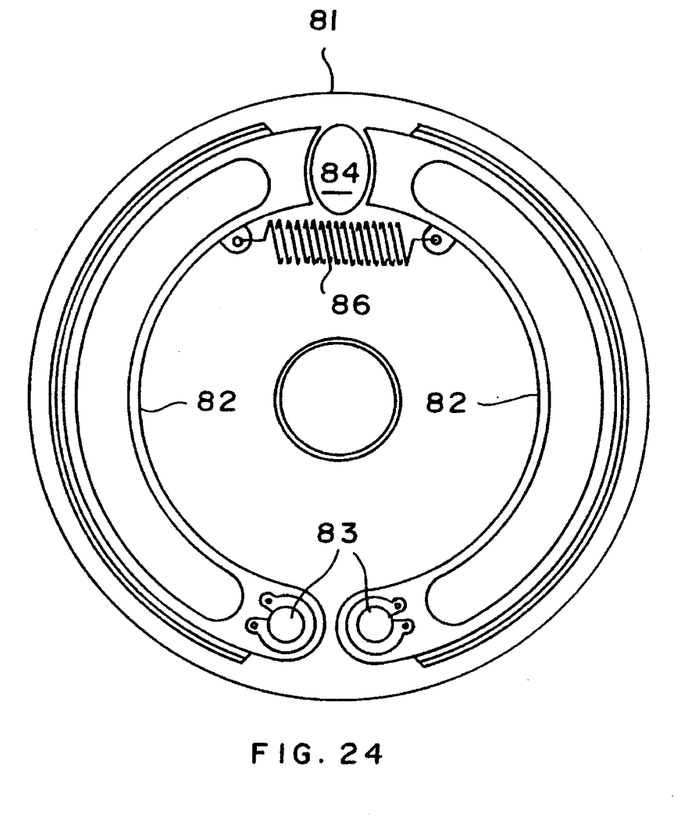
FIGS. 24 and 25 are diagrams illustrating the brake mechanism of the instant invention.
Figure 25:
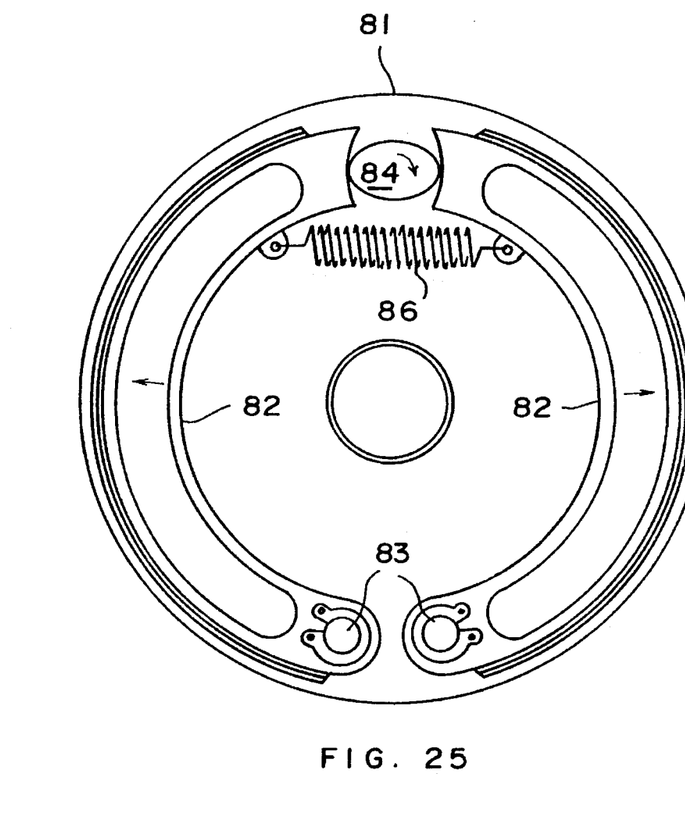

LOCKING DEVICE (8). Locking device 8 consists of the following elements:

1) The brake disc 81, that comprises the brake shoes 82, their guides 83, the shock-absorbent back springs 86, the drive cam 84 and its axle 85 (FIG. 24).

2) The brake drum (73, 74) against which the brake shoes 82 frictionally rub when the drive cam 84 is actuated (FIG. 25), thus preventing its rotating.

Figure 26:
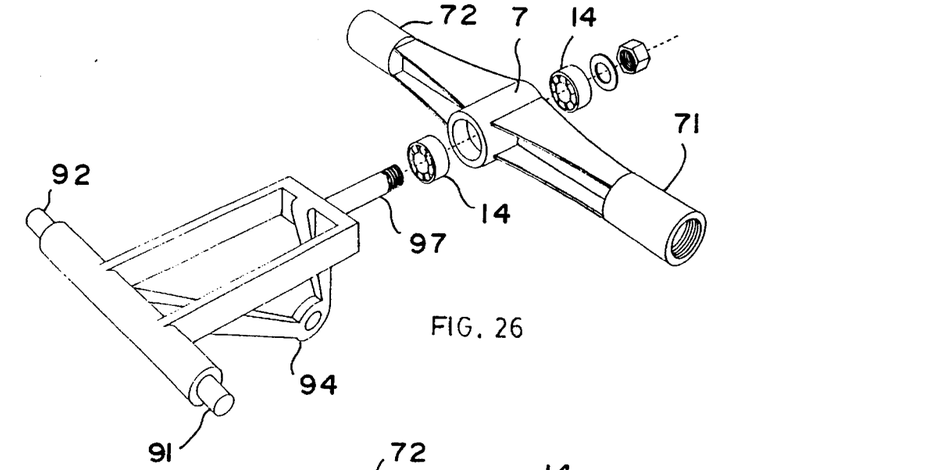
FIGS. 26, 27, 28, 29, 30, 31, 32 and 33 each illustrate a perspective view of an embodiment of the instant invention assembly.

Obviously, if the mechanism does not incorporate locking of the balancer's rotation, these elements of locking device 8 become superfluous (FIG. 26). If however, the locking device 8 is used, the location of these elements shall differ depending on whether or not the balancer is an integral part of the axle.

In case the axle is not an integral part of the balancer 7, the brake disc 81 with all of its elements is located in the front portion of the axle itself, becoming an integral part of the described assembly 9. The drum is connected to the balancer 7 or is an integral part of it. The balancer 7 is inserted on that axle 97 that ends in a screw thread that allows, by means of one or more screws, its firm fastening to the assembly (FIG. 27).

In case the axle 98 is an integral part of the balancer 7', the brake disc 81 with all of its elements is located in the front portion of the assembly 9', becoming a part of it. The axle 98, which is independent of the assembly 9', is inserted longitudinally in the guide, protruding from it with its front portion for coupling the brake drum 74, and with its rear portion for coupling the balancer 7' (FIG. 28).

Figure 32:
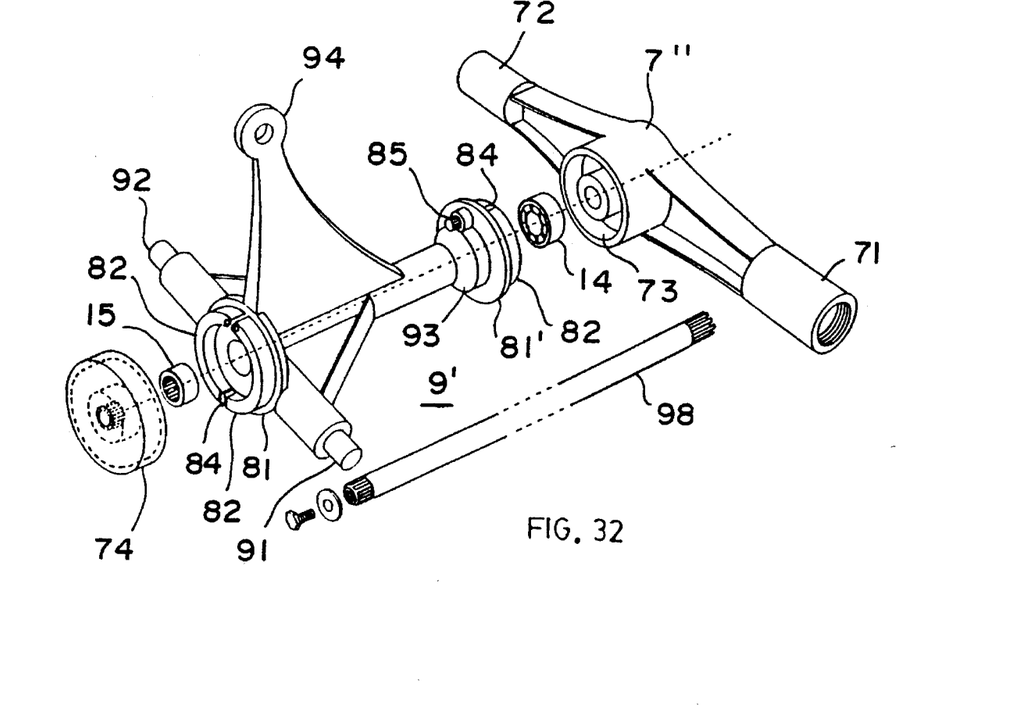
Figure 33:
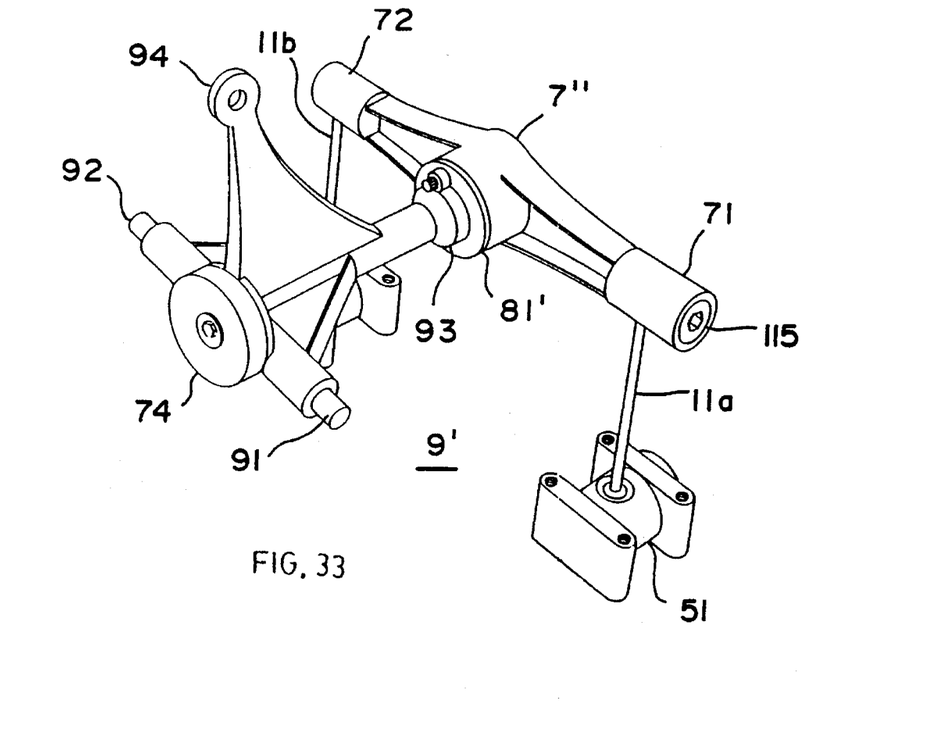

It is also possible to design the mechanism with a double locking device. In this case, the axle guide-bracket assembly 9' is provided with two brake discs (81, 81'), one located in the front portion and the other one in the rear. The one (81) in front faces the independent drum 74 that is fastened to the axle 98 at its front end, and the one 81' in the rear faces the drum 73 that is incorporated into the balancer 7. This balancer is fasted to the axle 98 at its rear end (FIGS. 32 and 33).

The two options for locking the balancer's rotation can be used either jointly or separately. In the latter case, one option may be reserved for a manual locking and the other for an automatic locking. That is to say, one of the options may be for temporary locking during operation and the other one for permanent locking when parking the vehicle.

With this we deem as concluded the description of the embodiments. However, in its adaption to the vehicle set forth herein, we deem necessary the following considerations:

A) In view of the considerable oscillations that may be reached by the rear wheels of the vehicle if the vehicle carries the driver and passenger, the adoption of all or of some of the below measures is recommended with respect to a conventional motorcycle: a lengthening of 15 or 20 centimeters of the wheel base; the use of rear wheels of less diameter; a slight moving forward of the driver's position and a somewhat higher positioning of the passenger seat.

B) Because of the same reason (oscillating of the rear wheels), it is recommended that, for the secondary chain drive (or pully), the drive pinions be located on the axle of the swinging forks, so that a constant tension is obtained in any situation. This would make unnecessary the use of tension devices. Both drive pinions could be actuated by a third pinion, located at a central position with respect to them, that receives the driving force.

C) Although the width of the vehicle's gage is small (for example, between 20 and 45 centimeters), the different spinning along the curves for each of the rear wheels requires the adopting of some mechanism to release the tensions produced in the transmission. If, as recommended in the foregoing consideration, the pinions are located on the same axle as the swinging forks, between the central pinion and any of the lateral pinions, but simultaneously only with one of them, the possibility of a limited different rotating must be recognized. If the drive pinions are located in the engine, some type of differential or a similar mechanism must be installed in the engine.

D) The locking of the balancer's rotation along a curve subjects the swinging forks and the rear wheels to greater stresses than in a conventional motorcycle. Therefore, the swinging forks must offer a greater resistance to torsion; the rims of the wheels must be of a light-weight alloy and the tires be of a low profile to avoid their slipping off the rim.

E) The width of the rear gage increases with the tilt given to the vehicle, according to the formula $$A = \frac{a}{\cos \alpha},$$

wherein A is the width of the gage when the vehicle is in a tilted position, a is the width of the gage with the vehicle in a vertical position, and $\alpha$ is the tilt angle of the vehicle with respect to the vertical. This widening of the gage entails certain transverse friction in the rear tires, which is insignificant while the vehicle is moving, including on steep slopes.

I claim:

1. A three wheeled vehicle, comprising:

a frame:

a front wheel mounted to a fork telescopically extending from the front of said frame;

a first rear wheel mounted to a first swinging fork having a ball joint;

a second rear wheel mounted to a second swinging fork having a ball joint;

a transversal axle extending from said frame for movably fastening said first and second swinging forks at the respective front parts thereof so that said swinging forks each are allowed an independent oscillating movement;

a balancer having two ends, said balancer being positioned in a plane that is parallel to said swinging forks, said balancer being fixed at its midsection by another axle so that said balancer is freely rotatable at any direction;

ball joints housed at each of said two ends of said balancer;

a first rod for connecting the ball joint of said first swinging fork to one of the ball joints of said balancer;

a second rod for connecting the ball joint of said second swinging fork to the other of the ball joints of said balancer;

an assembly having its front portion coupled to said frame in such a way that its rear portion can oscillate in an up-and-down fashion; and a locking mechanism coupled to said assembly and working cooperatively with said balancer for braking the rotation of said balancer at appropriate times so as to provide static balance and safety margins for said vehicle at potentially dangerous situations.

2. Vehicle of claim 1, wherein said axle of said balancer is an independent element longitudinally introduced in said assembly with its front portion coupled to a brake drum of said locking mechanism and its rear portion coupled to said balancer.

3. Vehicle of claim 2, further comprising:

a shock absorber having one end coupled to an arm of said assembly and another end coupled to said frame.

4. Vehicle of claim 2, wherein said locking mechanism comprises:

a double locking device for positioning a brake disc to the rear of said assembly to face a brake drum, said brake drum being a part of said balancer.

5. Vehicle of claim 1, wherein said locking mechanism comprises:

a brake disc positioned to the rear end of said assembly to face a brake drum integrated to said balancer.

* * * * *